United States Patent
Bueno et al.

(10) Patent No.: US 7,244,955 B2
(45) Date of Patent: Jul. 17, 2007

(54) COMPUTED RADIOGRAPHY SYSTEMS AND METHODS OF USE

(75) Inventors: Clifford Bueno, Clifton Park, NY (US); Nelson Raymond Corby, Jr., Scotia, NY (US); Kenneth Gordon Herd, Nishayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/304,295

(22) Filed: Dec. 15, 2005

(65) Prior Publication Data

US 2007/0138419 A1 Jun. 21, 2007

(51) Int. Cl.
*G01N 23/04* (2006.01)
(52) U.S. Cl. ............... 250/586; 250/580; 250/581; 250/582
(58) Field of Classification Search ............... 250/586, 250/580, 581, 582; 378/98, 98.8, 901
See application file for complete search history.

(56) References Cited

U.S. PATENT DOCUMENTS

| | | | |
|---|---|---|---|
| 4,926,045 A * | 5/1990 | Hosoi et al. ............... | 250/585 |
| 4,933,558 A | 6/1990 | Carter et al. | |
| 4,953,038 A | 8/1990 | Schiebel et al. | |
| 5,519,751 A | 5/1996 | Yamamoto et al. | |
| 5,796,113 A | 8/1998 | Nagli et al. | |
| 5,864,146 A | 1/1999 | Karellas | |
| 5,874,744 A * | 2/1999 | Goodman et al. .......... | 250/584 |

(Continued)

FOREIGN PATENT DOCUMENTS

EP 0417884 3/1991

(Continued)

OTHER PUBLICATIONS

S. Munekawa et al., "Imaging Plates as Detectors for X-Ray Diffraction", X-ray Research Laboratory, www.rigakumsc.com/protein/application_notes/IP-AppNote.pdf. .

(Continued)

*Primary Examiner*—David Porta
*Assistant Examiner*—Mark R. Gaworecki
(74) *Attorney, Agent, or Firm*—Penny A. Clarke; Patrick A. Patnode

(57) ABSTRACT

A computed radiography (CR) system for imaging an object is provided. The system includes a radiation source, a storage phosphor screen, an illumination source and a two dimensional imager. The radiation source is configured to irradiate the storage phosphor screen, and the storage phosphor screen is configured to store the radiation energy. The illumination source is configured to illuminate at least a sub-area of the storage phosphor screen to stimulate emission of photons from the storage phosphor screen. The two dimensional (2D) imager is configured to capture a two dimensional image from the storage phosphor screen using the stimulated emission photons. A method of reading a storage phosphor screen is also provided. The method includes illuminating at least a sub-area of the storage phosphor screen using an illumination source to stimulate emission of photons from the storage phosphor screen. The method further includes capturing at least one 2D image using a 2D imager, from at least a sub-array of the storage phosphor screen using the stimulated photons.

43 Claims, 8 Drawing Sheets

U.S. PATENT DOCUMENTS

| | | | |
|---|---|---|---|
| 5,998,802 A | 12/1999 | Struye et al. | |
| 6,373,074 B1 | 4/2002 | Mueller et al. | |
| 6,717,174 B2 * | 4/2004 | Karellas | 250/582 |
| 6,960,778 B2 | 11/2005 | Furue | |
| 2001/0028047 A1 * | 10/2001 | Isoda | 250/586 |
| 2002/0008212 A1 | 1/2002 | Arakawa et al. | |
| 2002/0011577 A1 | 1/2002 | Arakawa et al. | |
| 2002/0096653 A1 | 7/2002 | Karasawa | |
| 2003/0042445 A1 | 3/2003 | Mitchell et al. | |
| 2005/0109963 A1 | 5/2005 | Kerr et al. | |

FOREIGN PATENT DOCUMENTS

| | | |
|---|---|---|
| EP | 0859244 | 8/1998 |
| EP | 0862066 | 9/1998 |
| EP | 1001276 | 5/2000 |
| EP | 1014684 | 6/2000 |
| EP | 1065671 | 1/2001 |
| EP | 1103846 | 5/2001 |
| EP | 1503241 | 2/2005 |
| WO | 03/021293 | 3/2003 |

OTHER PUBLICATIONS

F. Casali et al., "Development of high resolution X-ray DR and CT systems for non-medical applications", DGZIP-Proceedings BB 84-CD, CT-IP 2003, pp. 329-336.

TeraRecon, Inc., Visionary system, www.terarecon.com.

M. Rossi et al., "An experimental micro-CT system for X-ray NDT", Proceedings of SPIE, vol. 4503, 2002, pp. 338-348.

* cited by examiner

COMPUTED RADIOGRAPHY SYSTEMS AND METHODS OF USE

BACKGROUND

The invention relates generally to computed radiography (CR) systems and more particularly to a system and method for improving the scan speed and image quality in computed radiography systems.

Computed radiography systems employ imaging techniques that capture X-rays as they pass through an object to be imaged using an imaging plate coated with a storage phosphor. The object to be imaged is typically exposed with X-rays, and a latent X-ray image is formed on the imaging plate. The storage phosphor on the imaging plate when stimulated with a low energy scanned light beam (such as a laser beam) releases visible light at locations where X-rays are absorbed. The light is then captured and converted into an electrical signal, which is subsequently converted to data that can be transmitted to remote systems or locations and displayed on laser-printed films or softcopy workstations and stored digitally.

Traditionally, computed radiography scanning techniques employ a continuously scanning laser beam with an optical integrating detector system. Scanning is typically performed in a raster format to cover the entire imaging plate. The scanning laser beam repeatedly scans the imaging plate in a horizontal direction while the imaging plate is slowly moved in an orthogonal direction thus scanning the entire plate surface. Some CR systems also employ a linear array scanner that scans the imaging plate one line at a time with a line of stimulating light. However, linear array CR scanners require that the scanning device transport the imaging plate past an optical read device (using a system of rollers). This contact may eventually damage the imaging plate to a point where it is no longer usable. The above scanning approaches limit the amount of light that can be collected from the storage phosphors as the residence time per pixel or per line is limited by a practical scan time taken for the imaging operation. In addition, calibrations of these devices are one-dimensional (one row across the plate) and do not compensate for non-uniformities in the X-ray beam or phosphor granularity.

In addition, and as will be appreciated by those skilled in the art, only a portion of the X-ray energy deposited onto the CR phosphor plate is generally stored. A substantial amount of light (due to the impinging X-ray energy) is emitted promptly at the time of exposure, which is generally not captured by a detector. Therefore, much of the energy deposited onto the CR plates is lost due to failure to collect this prompt emission. Further, in existing CR reading processes used to retrieve the stored emission information, some signal remains in the phosphor plate, which is typically wasted during the erasure cycle. The X-ray energy losses due to prompt and non-retrieved stored emission reduce the detective quantum efficiency and signal to noise ratio for X-ray exposures that would otherwise result in a much higher image scan quality. In medical applications, this energy is imparted to the patient without benefit of enhanced diagnosis. In nondestructive testing applications, this wasted energy results in longer throughput cycles for collecting imagery than otherwise desired.

It would therefore be desirable to develop a CR scanning technique that enables complete and efficient energy collection from the CR plate. In addition, it would be desirable to develop a CR scanning technique that is capable of collecting both prompt and stored emission from a CR plate during an X-ray exposure. It is also desirable to create a system with no moving parts to avoid damage to the imaging plates and to result in an easily maintained device.

BRIEF DESCRIPTION

In one embodiment, a computed radiography (CR) system for imaging an object is provided. The system includes a radiation source, a storage phosphor screen, an illumination source and a two dimensional imager. The radiation source is configured to irradiate the storage phosphor screen through an object, and the storage phosphor screen is configured to store the radiation energy pattern of the object. The illumination source is configured to illuminate at least a sub-area of the storage phosphor screen to stimulate emission of photons from the storage phosphor screen to provide a visible description of the object under examination. The two dimensional (2D) imager is configured to capture a two dimensional image from the storage phosphor screen using the stimulated emission photons.

In another embodiment, a computed radiography readout system is provided. The system includes an illumination source configured to illuminate at least a sub-area of a storage phosphor screen to stimulate emission of photons from the storage phosphor screen. The system further includes a two dimensional (2D) imager configured to capture a two dimensional image from at least a sub-area of the storage phosphor screen using the stimulated emission photons.

A method embodiment of reading a storage phosphor screen is also provided. The method includes illuminating at least a sub-area of the storage phosphor screen using an illumination source to stimulate emission of photons from the storage phosphor screen. The method further includes capturing at least one 2D image using a 2D imager, from at least a sub-array of the storage phosphor screen using the stimulated photons.

A method embodiment for registering a storage phosphor screen is also provided. The registration method includes recording an identification number for a storage phosphor screen. The registration method further includes retrieving a correction function associated with the storage phosphor screen, based on the identification number. The registration method further includes registering the storage phosphor screen in the field of view of an imaged object using the correction function.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
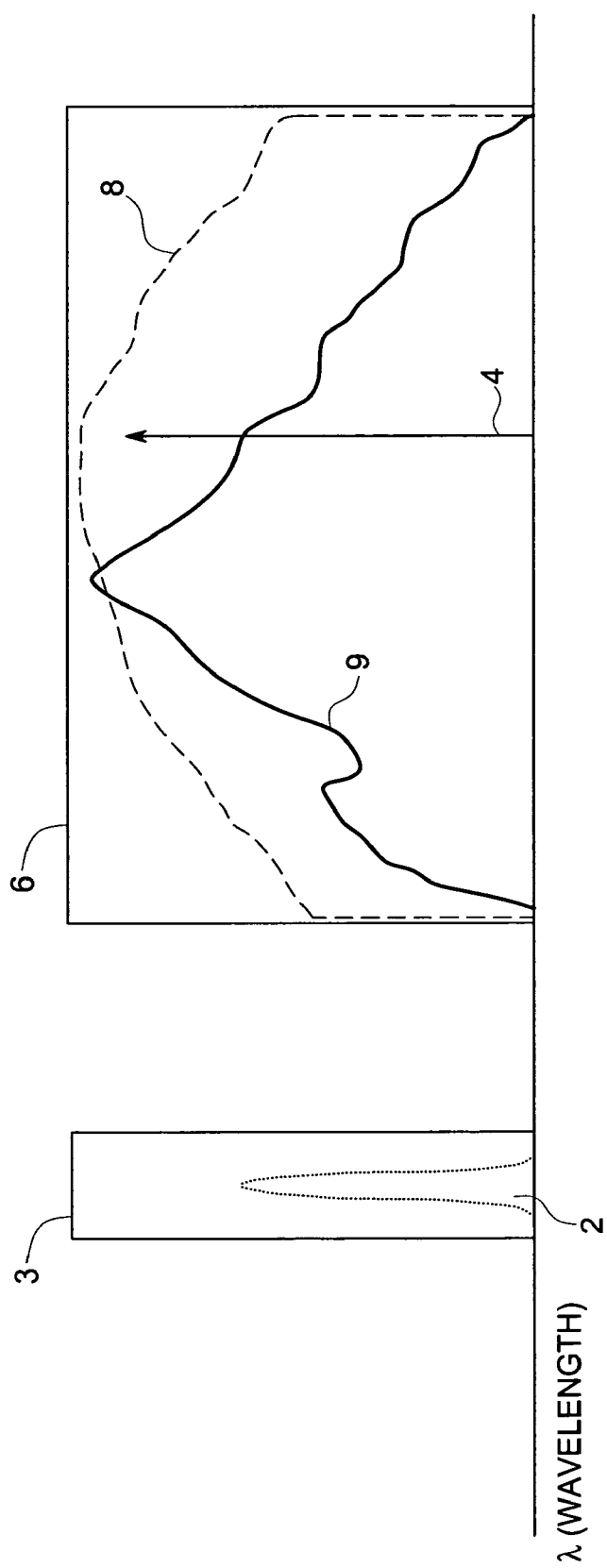
FIG. 1 is a graph illustrating the characteristic stimulation and emission behavior of a typical storage phosphor and the spectra of different stimulating light sources.

FIG. 1 is a graph illustrating the characteristic stimulation and emission behavior of a typical storage phosphor and the spectra of different stimulating light sources 4 and 8. As may be observed from FIG. 1, the desired stimulated and prompt emission spectra 2 and the stimulating excitation spectral band 6 have non-over lapping or disjoint wavelengths, thereby allowing the emission spectrum 2 (corresponding to the desired stored latent X-ray exposure pattern) to be recovered in the presence of the stimulating energy (envelope 6). Curve 9 shows the characteristic stimulation function for a typical storage phosphor. Conventional CR systems use a narrow band source (typically a laser) with characteristic spectrum 4 (shown through the use of an impulse-like function) to stimulate the storage phosphor to allow easier eventual separation of emission energy 2 in the presence of any stimulating energy 4. The total stimulating energy imparted to the phosphor is proportional to the product of curve 4 and 9 integrated over total exposure time. Since the bandwidth of source 4 is small (typically only a few nanometers), it is necessary to adopt a scanning approach using a small focused laser spot to achieve the necessary energy deposition over the 2D imaging plate surface at reasonable laser cost.

Embodiments of the present invention make use of a more efficient strategy, as will be described in greater detail below with respect to FIGS. 2-7. For the particular example shown in FIG. 1, a source with a continuous distributed spectrum 8 is employed (only the spectrum within acceptance band 6 is shown). As will be appreciated by those skilled in the art, incandescent sources such as tungsten filament lamps or halogen tungsten incandescent lamps have spectra such as the continuous spectrum 8 and are very low in cost and high in optical power. Other lamps possessing a combination of continuous and discrete spectra (such as arc discharge lamps) may also be used. Since total stimulating energy to the phosphor is proportional to the product of curves 9 and 8 (integrated over the total exposure time), a large amount of optical power can be delivered to the storage phosphor without the need to scan an expensive focused optical source such as a laser.

Embodiments of the present invention disclose an illumination method that can economically deliver stimulating energy to the entire plate surface within a short time. As will be described in greater detail with respect to FIG. 2 and FIG. 3 below, the disclosed two-dimensional imaging system captures the stimulated energy from the entire plate surface (or sub-areas of the imaging plate) and is parallel over the entire stimulating period. Further, imagers with high responsivity (the joint effect of high detector quantum efficiency and high gain) at the emission wavelengths are available at reasonable cost. Example imagers are discussed with respect to FIG. 2 and FIG. 3. The wider-band optical emission spectrum of the "raw" optical source is filtered to obtain a curve like 8 by optical filters to maximize energy to the storage phosphor while limiting the excess stimulating light reaching the 2D camera near stimulated emission spectrum 2. In a particular embodiment, to further reject stray, non-stimulated emission into the 2D camera, an optical bandpass filter with passband in region 3 is placed in front of the camera. Example optical filters are discussed with respect to FIG. 2 and FIG. 3. Example 2D cameras are discussed with respect to FIG. 2 and FIG. 3.

Figure 2:
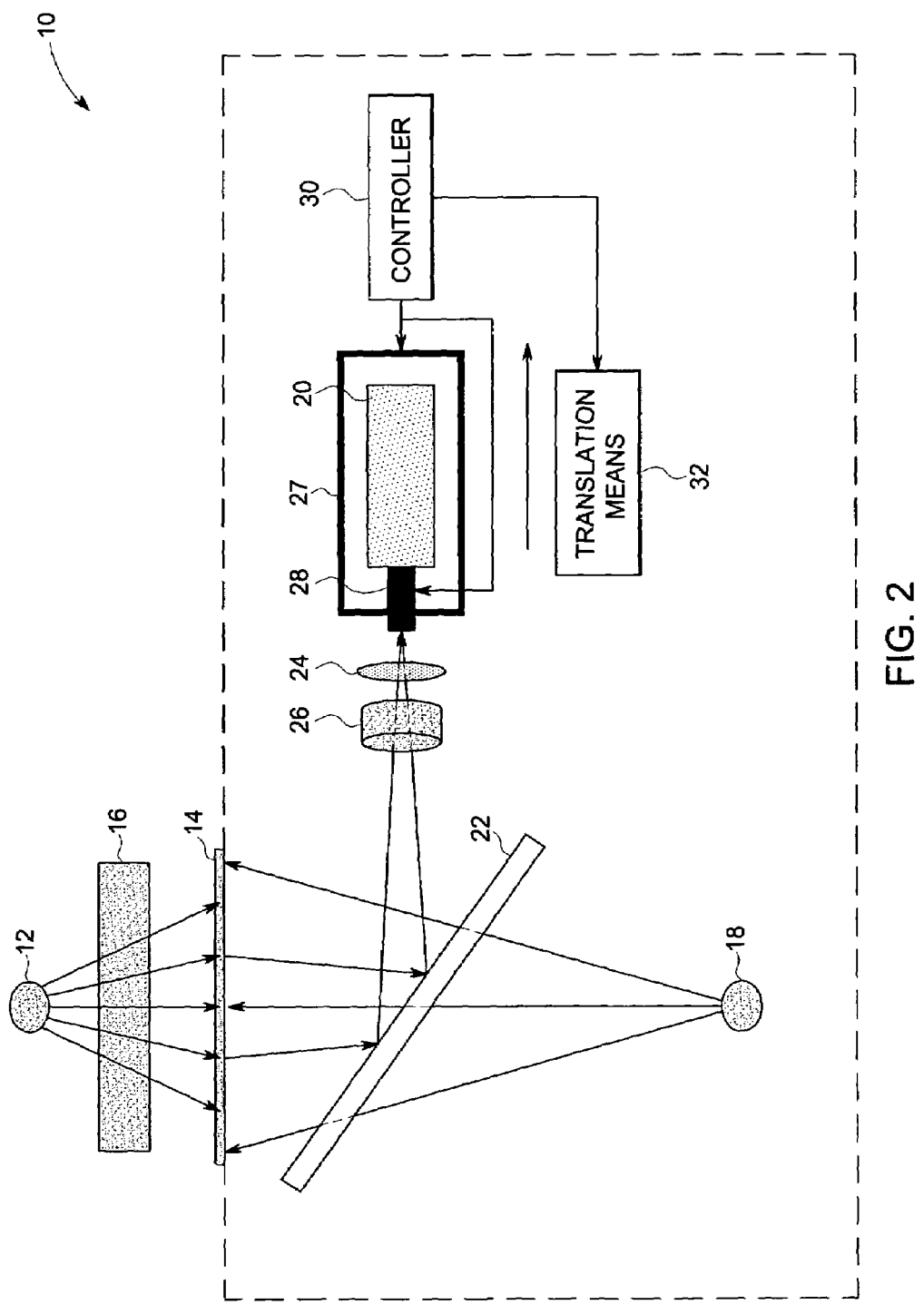
FIG. 2 is an illustration of a two-dimensional computed radiography (CR) scanning system for imaging an object.

FIG. 2 is an illustration of a two-dimensional computed radiography (CR) scanning system 10 for imaging an object. Embodiments of the present invention have medical and non-destructive evaluation (NDE) applications. For medical applications, the object may comprise a person or animal or portion thereof. For NDE applications, the object may, for example, comprise an industrial part. In accordance with one embodiment, and as illustrated in FIG. 2, the system 10 generally includes a radiation source 12, a storage phosphor screen 14, an illumination source 18 and a two dimensional imager 20. Non-limiting examples of the radiation source 12 include an X-ray source or a gamma-ray source. Although many of the embodiments described herein depict X-rays as an exemplary type of radiation for CR, it will be appreciated that the disclosed invention is also applicable to other radiation types, such as gamma rays, neutrons, or charged particles, for example. The radiation source 12 passes X-rays through an object 16 of interest and irradiates the storage phosphor screen 14. The storage phosphor screen 14 stores radiation energy irradiated from the radiation source 12. An illumination source 18 (typically yellow-red light) illuminates a sub-area or portion of the storage phosphor screen 14 and stimulates the emission of photons corresponding to trapped X-ray energy in the storage phosphor screen 14. The stimulated photons correspond to an earlier X-ray intensity at the site of stimulation. When the photons corresponding to trapped X-ray energy are released, a spectrum of violet-blue light is typically emitted from the storage phosphor screen 14. The illumination source 18 may also be configured to illuminate the entire storage phosphor screen 14. In one embodiment, the illumination source 18 is a narrow-band, optical source, non-limiting examples of which include a laser or a laser diode. The illumination source 18 may also comprise a broad spectrum illumination source, filtered incandescent sources, filtered low pressure sodium lamps, light emitting diodes (LED), super luminescent light emitting diodes (SLED), single bulbs or an array of bulbs.

A two-dimensional (2D) imager 20 is configured to capture a two-dimensional image using the stimulated emission photons from the storage phosphor screen 14. In accordance with one embodiment, the storage phosphor screen 14 is configured to emit prompt emission photons upon irradiation from the radiation source 12, and the 2D imager 20 is further configured to receive the prompt emission photons from the storage phosphor screen. In one non-limiting example, the 2D imager is configured to have a linear 16-bit dynamic range and comprises a 4096×4096 array.

In a particular embodiment, the 2D imager 20 may include a solid-state camera. The 2D imager 20 may also include a charge coupled device (CCD) camera, a complementary metal oxide semiconductor (CMOS) camera, or a charge injection device (CID) camera. The CCD camera may include a thinned back-side illuminated CCD that includes a blue-enhanced imager to improve the quantum efficiency of the 2D imager 20 to blue light, in order to improve the overall efficiency of the device. Further enhancement of the imager in this region may also be achieved by a wavelength shifting phosphor placed in intimate contact with the imaging device itself, thus converting the higher energy blue light (for example) into a higher wavelength where the detector has a greater quantum efficiency. In another embodiment, the 2D imager 20 may include a photodiode array, such as, for example an amorphous silicon photodiode array. Further, the 2D imager 20 may be designed to have low noise electronics, and multi pinned phase (MPP) CCD logic to provide low dark current for long exposure times. In one embodiment, the 2D imager is configured to capture a 2D image of a sub-array of the storage phosphor screen. In another embodiment, the 2D imager is configured to capture a 2D image of a magnified region of the storage phosphor screen. In other words, if the phosphor is not completely read-out, it can be read a second time, with a magnified view, and a magnified illumination. In one embodiment, a more concentrated light source may be used to illuminate a portion of the plate, and the camera may be moved closer to the phosphor to center in on just that region affording a higher spatial resolution of an area of interest. All this is achieved without re-exposing the object, and without having to adjust conditions to get a different x-ray geometric magnification to achieve a similar effect. In addition, the 2D image of a sub-array may be acquired with 1:1 optics or with magnification optics, thereby affording a possible increase in spatial resolution in this magnified region.

Referring to FIG. 2, the system 10 further optionally includes a dichroic filter 22 positioned between the illumination source 18 and the storage phosphor screen 14. The dichroic filter 22 passes stimulating illumination (typically yellow-red spectra) from the illumination source 18 to the storage phosphor screen 14 and reflects stimulated emission photons (typically blue spectra) from the storage phosphor screen 14. The 2D imager 20 is further configured to receive the stimulated emission photons reflected by the dichroic filter 22. In one embodiment, the dichroic filter includes a dichroic beam splitter. Optionally, a blue pass filter 24 is disposed between the dichroic filter 22 and the 2D imager 20 to further filter the residual stimulating (yellow-red) illumination and allow the passage of only desirable stimulated (blue) light from the storage phosphor screen 14.

The system 10 further optionally includes a shielding means 26 and a radiation shield 27, disposed between the dichroic filter 22 and the 2D imager 20. The shielding means 26 may be formed of leaded glass or crown glass, for example, and the radiation shield 27 may take the form of a lead shield. Shielding means 26 and radiation shield 27 protect 2D imager 20 from radiation from radiation source 12. For the embodiment depicted in FIG. 2, a lens system 28 is operatively connected to the 2D imager 20. The lens system 28 may include a multi element lens corrected for spatial and wavelength aberrations, a spatial imaging lens, a zoom lens or a high transmission lens. According to a particular embodiment, the lens system 28 is further configured to have a high geometric accuracy and a large aperture tailored to the amount of light being collected. The shielding glass 26, and lens system 28 may also include anti-reflection coatings to avoid multiple reflections that can degrade image quality. The lens system 28 and the 2D imager 20 are optionally controlled by a controller 30. In accordance with the present embodiment, the 2D imager 20 and the lens system 28 are configured to read out a region of interest on the storage phosphor screen 14 to perform sub-array imaging. The system 10 further optionally comprises a translation means 32 configured to move the 2D imager 20 and focus the lens system 28. For this embodiment, the controller 30 is further configured to control the translation means 32. In a particular example, the translation means 32 includes a translation stage.

Referring again to FIG. 2, the light collected from both the prompt emission and the stimulated emission can be combined to form an image that has improved performance over either one individually. Optionally, the system 10 may also be used to capture just the stimulated emission, allowing the mobility of the phosphor plate to be used to capture an image from a radiation source outside of system 10, prior to return to system 10 for reading the storage phosphor. As will be appreciated by those skilled in the art, the captured image may be made available externally for viewing and analysis through a local network connected to the CR scanning system 10.

Figure 3:
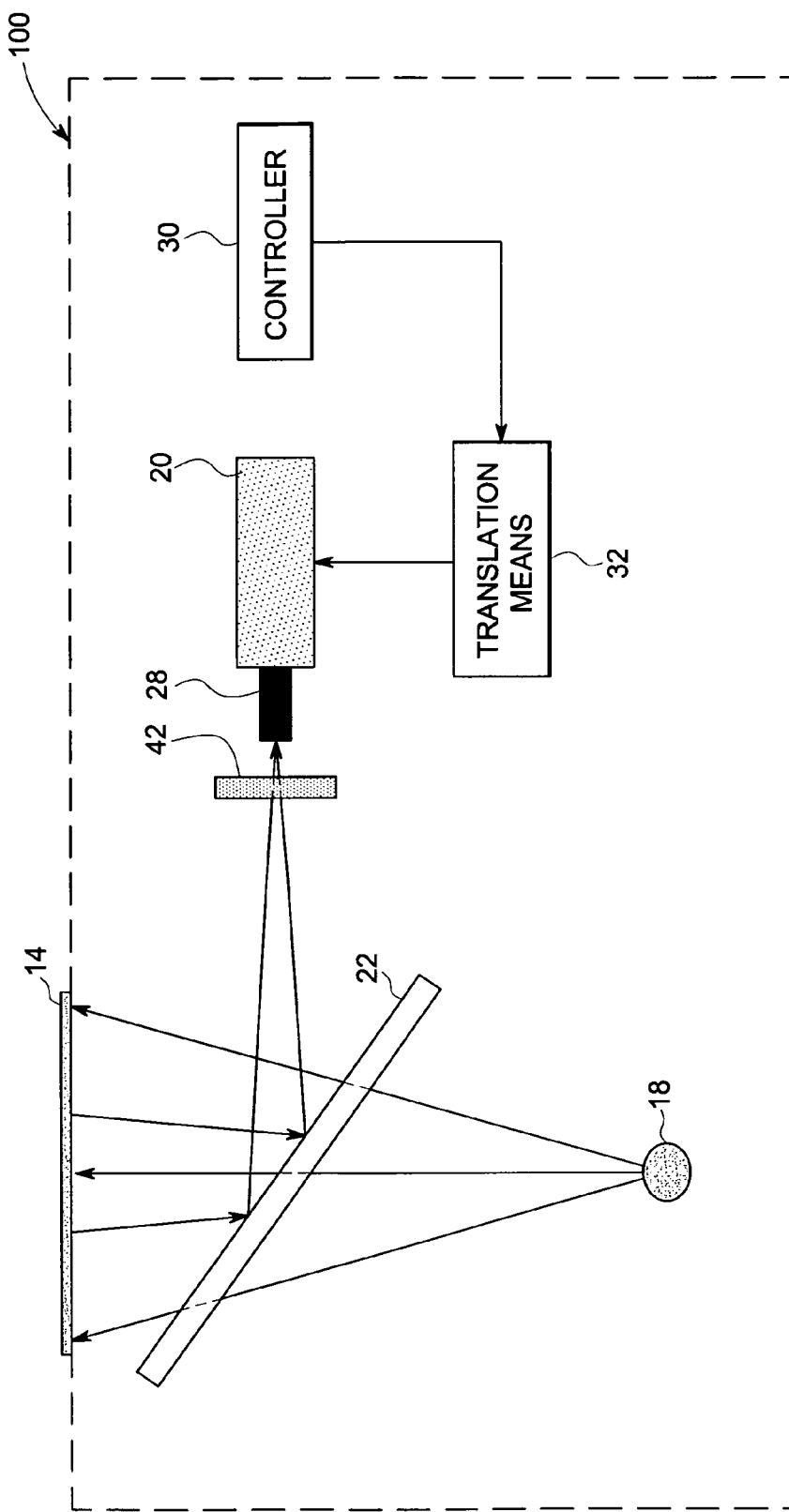
FIG. 3 is an illustration of a two-dimensional CR readout system for reading a storage phosphor screen.

FIG. 3 is an illustration of a front-lit configuration of a two-dimensional (2D) computed radiography (CR) readout system for reading a storage phosphor screen. As shown in FIG. 3, the system 100 includes a storage phosphor screen 14, an illumination source 18 and a two dimensional imager 20. As discussed above, the storage phosphor screen 14 stores trapped X-ray energy. In one non-limiting example, the storage phosphor screen comprises $BaFBr:Eu^{2+}$. The storage phosphor screen may have an opaque backing or be in a cassette. An illumination source 18 (typically yellow-red light) illuminates a sub-area of the storage phosphor screen 14 and stimulates the emission of photons from the storage phosphor screen 14. The stimulated photons correspond to an earlier X-ray intensity at the site of stimulation. When the photons corresponding to trapped X-ray energy are released, a narrow spectrum of violet-blue light is typically emitted from the storage phosphor screen 14. The illumination source 18 may also be configured to illuminate the entire storage phosphor screen 14. In certain non-limiting examples, the illumination source 18 includes a laser or a laser diode. Other examples for illumination source 18 are discussed above. A two-dimensional (2D) imager 20 captures a two-dimensional image using the stimulated emission photons from the storage phosphor screen 14. As mentioned above, the 2D imager 20 may include a solid-state camera, a CCD camera, a CMOS camera, or a CID. In another embodiment, the 2D imager may include a photodiode array, such as, for example an amorphous Silicon photodiode array.

Referring to FIG. 3, the system 100 further optionally includes a dichroic filter 22 positioned between the illumination source 18 and the storage phosphor screen 14. The dichroic filter passes stimulating illumination (typically yellow-red spectra) from the illumination source 18 to the storage phosphor screen 14 and reflects stimulated emission photons (typically blue spectra) from the storage phosphor screen 14. The 2D imager 20 is further configured to receive the stimulated emission photons reflected by the dichroic filter 22. In one embodiment, the dichroic filter includes a dichroic beam splitter. Optionally, a narrow band filter 42 disposed between the dichroic filter 22 and the 2D imager 20 further filters the residual stimulating (red) illumination and allows the passage of only desirable stimulated (blue) light from the storage phosphor screen 14.

Optionally, the system further includes a lens system 28 that is operatively connected to the 2D imager 20. The lens system 28 may include a multi element lens corrected for spatial and wavelength aberrations, a spatial imaging lens, a zoom lens or a high transmission lens. The lens system 28 and the 2D imager 20 are optionally controlled by a controller 30. As mentioned above, the 2D imager 20 and the lens system 28 are configured to perform sub-array imaging if desired. The system 10 optionally further comprises a translation means 32 configured to move the 2D imager 20 and focus the lens system 28. For this embodiment, the controller 30 is further configured to control the translation means 32. Optionally, the storage phosphor 14 may be removed from system 100 for irradiation, and returned to system 100 for image capture by stimulation means as discussed above. Beneficially, the 2D imager 20 may be configured to read both a sub-array of the screen or the full area. In one embodiment, the 2D imager is configured to capture a 2D image of a sub-array of the storage phosphor screen. In another embodiment, the 2D imager is configured to capture a 2D image of a magnified region of the storage phosphor screen. As mentioned above, if the phosphor is not completely read-out, it can be read a second time, with a magnified view, and a magnified illumination. In one embodiment, a more concentrated light source may be used to illuminate a portion of the plate, and the camera may be moved closer to the phosphor to center in on just that region affording a higher spatial resolution of an area of interest.

A method embodiment for reading storage phosphor screens 14 is also provided and can be performed, for example, using 2D CR readout system 100. A method of reading a storage phosphor screen 14 includes illuminating at least a sub-area of the storage phosphor screen 14 using an illumination source 18 to stimulate emission of photons from the storage phosphor screen 14. The method further includes capturing at least one two-dimensional (2D) image using a 2D imager from at least a sub-array of the storage phosphor screen 14 using the stimulated photons. According to a particular embodiment, at least one 2D image from a magnified region of the storage phosphor screen 14 is also captured. As mentioned above, if the phosphor is not completely read-out, it can be read a second time, with a magnified view, and a magnified illumination. In one embodiment, a more concentrated light source may be used to illuminate a portion of the plate, and the camera may be moved closer to the phosphor to center in on just that region affording a higher spatial resolution of an area of interest. Further, multiple reads can be achieved based on the illumination intensity of the stimulation source.

According to another embodiment, the method further includes irradiating the storage phosphor screen 14 through an object 16 with a radiation source 12 to store a radiation energy pattern of the object 16, where the irradiating step is performed prior to the illuminating and capturing steps, and where the capturing step involves capturing at least one 2D image from the entire storage phosphor screen. The method further includes repeating the irradiating, illuminating and capturing steps, where the repetition of the capturing step involves capturing at least one 2D image from a magnified region of the storage phosphor screen, prior to the storage phosphor screen being depleted of the stored pattern.

Figure 4:
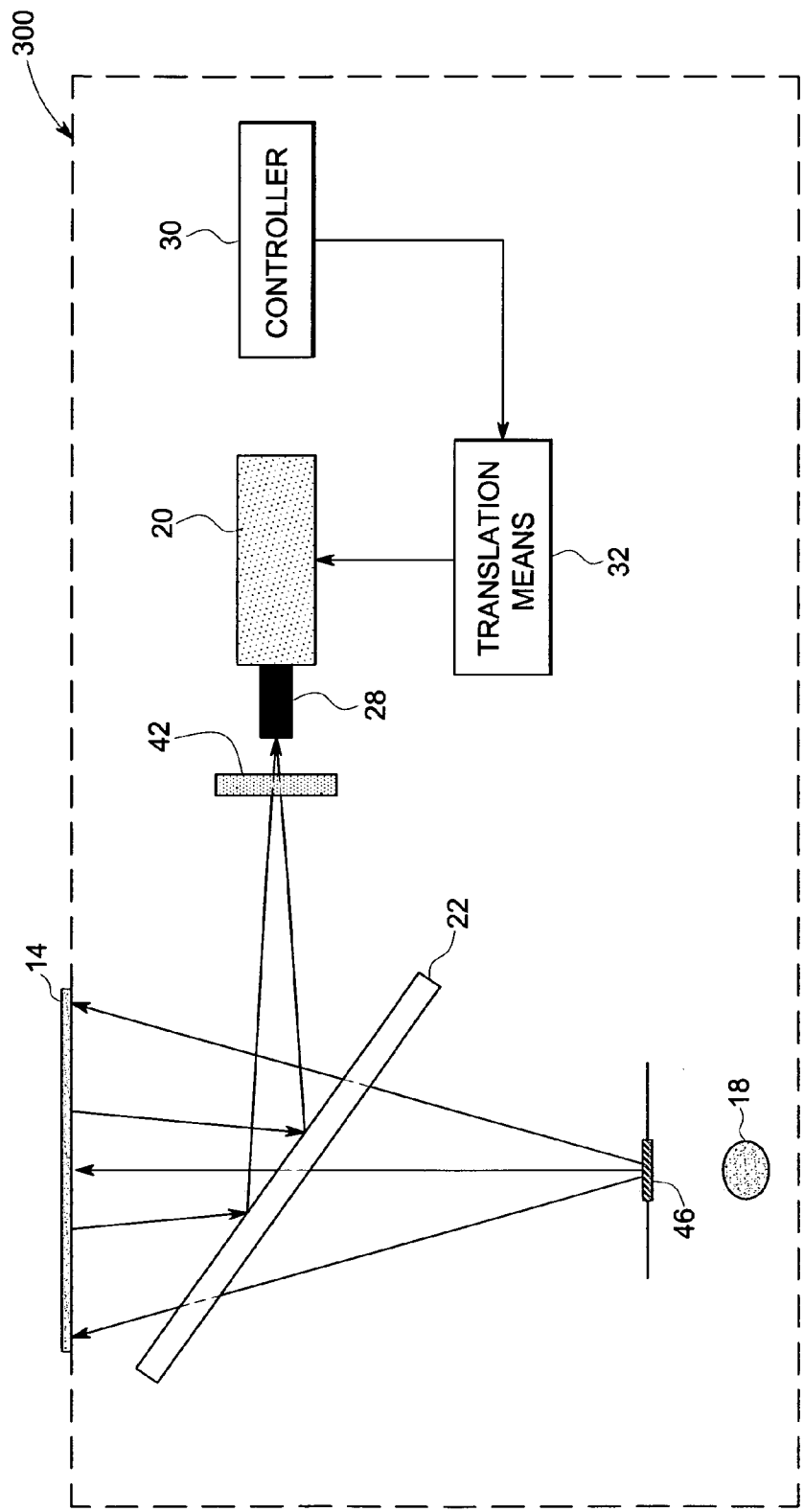
FIG. 4 is an illustration of a front-lit configuration for a two-dimensional CR readout system for reading a storage phosphor screen in accordance with another embodiment of the present invention.

FIG. 4 is an illustration of a front-lit configuration for a two-dimensional computed radiography (CR) readout system 300 for reading a storage phosphor screen in accordance with another embodiment of the present invention. The example embodiment of FIG. 4 employs a separate beam splitter 22 and filter 46, as discussed below. In a particular embodiment, and as shown in FIG. 4, the illumination source 18 is a broad emission spectrum light source. A filter 46 is disposed between the illumination light source 18 and a beam splitter 22. The filter 46 is configured to limit and match the illumination spectrum from the illumination source 18 to the absorption function of the storage phosphor screen 14. In one non-limiting example, the filter 46 comprises a Schott OG530 colored glass filter in cascade with an Edmund Scientific IR absorbing filter (part number 45649). As used herein, the absorption function of the storage phosphor plate 14 describes the range of wavelengths over which the material comprising the storage phosphor plate is able to absorb energy to release the latent image created by earlier X-ray exposure. The beam-splitter 22 is configured to pass stimulating energy (typically yellow-red spectra) already filtered by filter 46 to the storage phosphor screen 14 and reflect stimulated readout energy (typically blue spectra) to the 2D imager 20. The system 300 additionally optionally includes a narrowband filter 42 disposed between the beam splitter 22 and the lens system 28 operatively connected to the 2D imager (20). The narrowband filter is configured to further filter the residual stimulating (yellow-red) illumination and allow the passage of only desirable stimulated (blue) light from the storage phosphor screen 14. Further, the wavelength range of the narrowband filter 42 is configured to match the wavelength range of the emission spectrum from the storage phosphor plate 14. In one non-limiting example, the narrowband filter 42 comprises a Schott BG-12 colored glass filter.

Figure 5:
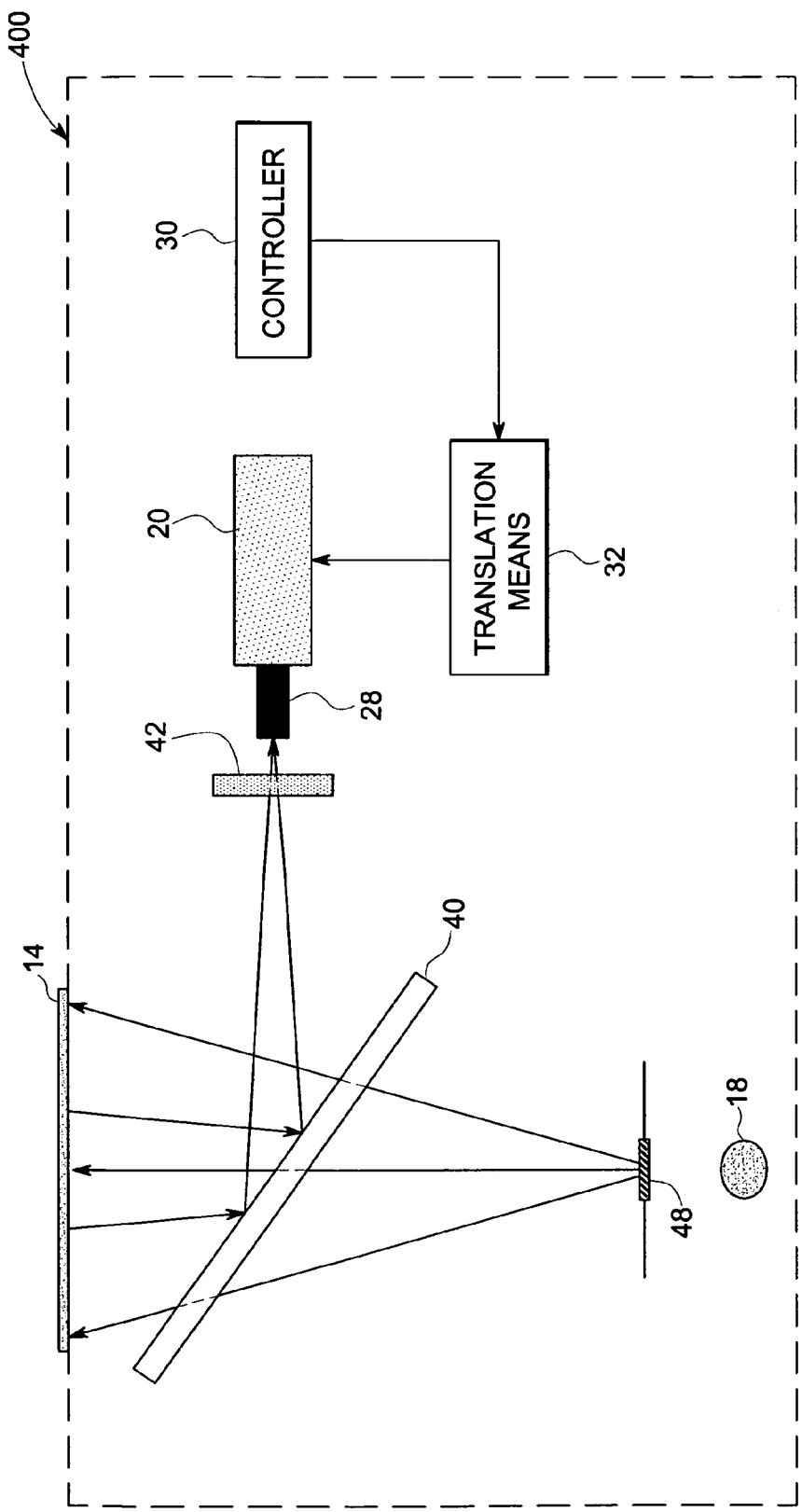
FIG. 5 is an illustration of a front-lit configuration for a two-dimensional CR readout system for reading a storage phosphor screen in accordance with yet another embodiment of the present invention.

FIG. 5 is an illustration of a front-lit configuration for a two-dimensional computed radiography (CR) readout system 400 for reading a storage phosphor screen in accordance with another embodiment of the present invention. As discussed below, the particular embodiment shown in FIG. 5 supplements a beam splitter filter 40 with an additional pre-filter 48. In a particular embodiment, and as shown in FIG. 5, the illumination source 18 is a broad emission spectrum light source. The pre-filter 48 is disposed between the illumination light source 18 and a beam splitter filter 40. The pre-filter 48 is configured to begin spectrally shaping the illumination spectrum to the absorption function of the phosphor screen 14. In one non-limiting example, the pre-filter 48 comprises a Schott GG 400 colored glass filter (which passes energy with wavelength greater than 400 nm). The system 400 further includes a beam-splitter filter 40 disposed between the pre-filter 48 and the storage phosphor screen 14. The beam-splitter filter 40 is configured to further spectrally shape the stimulating energy (typically yellow-red spectra) and reflect stimulated readout energy (typically blue spectra) from the storage phosphor screen 14 to the 2D imager 20. The beam-splitter filter 40 may be further configured to include multiple filters to perform optical filtering and achieve the desired overall transmission function. The system 400 optionally includes a narrowband filter 42 disposed between the beam-splitter filter 40 and a lens system 28 operatively connected to the 2D imager 20. The wavelength range of the narrowband filter 42 is configured to match the wavelength range of the emission spectrum from the storage phosphor plate 14. Namely, the narrowband filter 42 is configured to further filter the residual stimulating (yellow-red) illumination and allow the passage of only desirable stimulated (blue) light from the storage phosphor screen 14.

Figure 6:
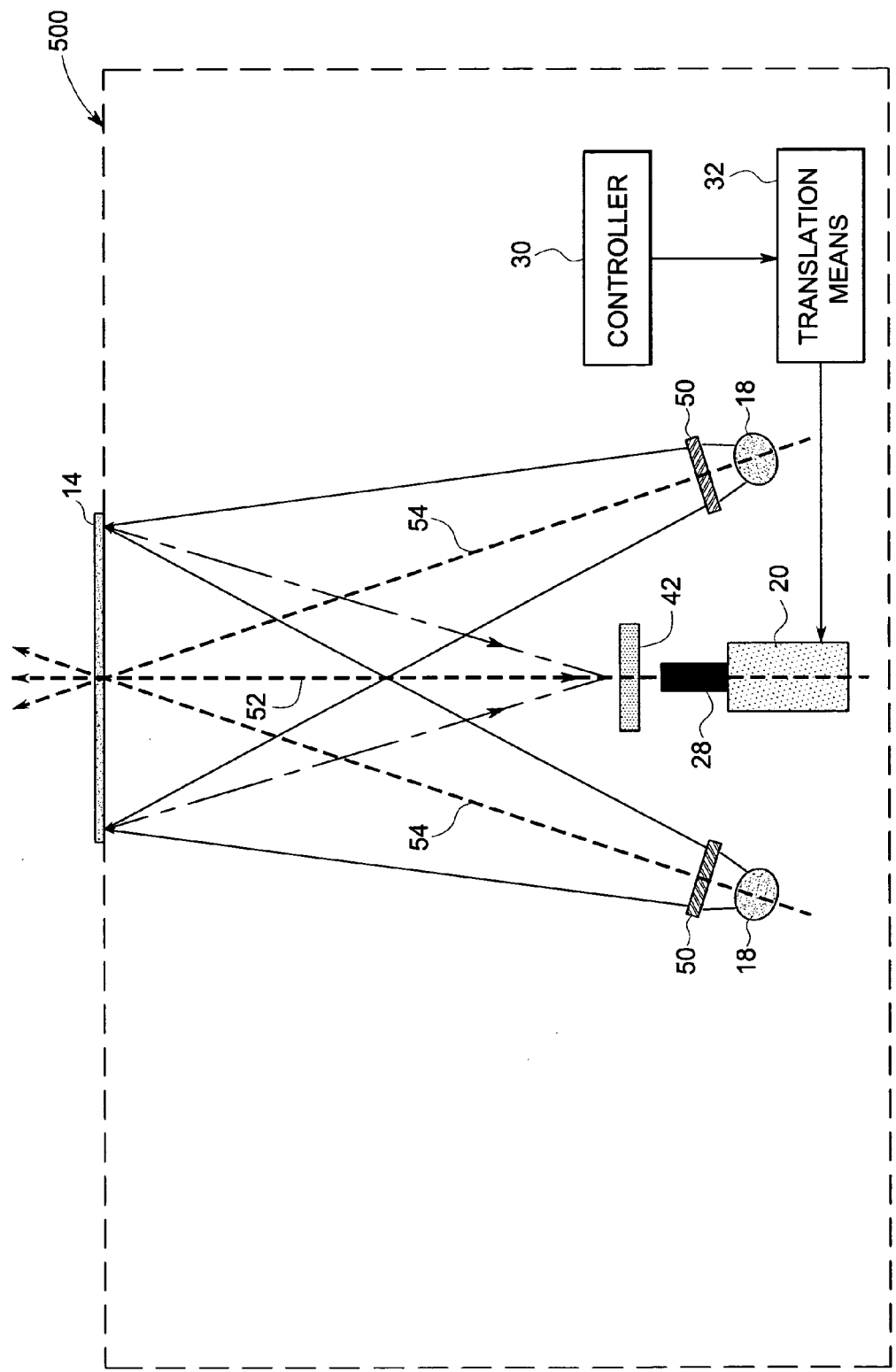
FIG. 6 is an illustration of a front-lit configuration for a two-dimensional CR readout system for reading a storage phosphor screen in accordance with yet another embodiment of the present invention.

FIG. 6 is an illustration of a front-lit configuration for a two-dimensional computed radiography (CR) readout system 500 for reading a storage phosphor screen in accordance with yet another embodiment of the present invention. In a particular embodiment, and as shown in FIG. 6, the system 500 includes one or more illumination sources 18 each configured as a broad emission spectrum light source. A filter 50 is disposed between each broad emission spectrum light source 18 and a storage phosphor screen 14. The filter 50 is configured to match and limit the illumination spectrum to the stimulated absorption function of the storage phosphor screen 14. The system 500 additionally includes a narrowband filter 42 disposed between a lens system 28 operatively connected to the 2D imager 20 and the storage phosphor screen 14. The wavelength range of the narrowband filter 42 is configured to match the wavelength range of the emission spectrum from the storage phosphor plate 14. Namely, the narrowband filter 42 is configured to further filter the residual stimulating (yellow-red) illumination and allow the passage of only desirable stimulated (blue) light from the storage phosphor screen 14. In a particular embodiment, the optical axis 52 of the 2D imager 20 is perpendicular to the storage phosphor screen 14 to minimize optical distortion while imaging the storage phosphor screen 14. As will be appreciated by those skilled in the art, the optical axis 52 may not necessarily be perpendicular to the storage phosphor screen. The filtered illumination axis 54 impinges on the storage phosphor screen 14 at an angle selected to create a compact enclosure for the system 500. Further, the one or more illumination sources 18 may be deployed spatially about the optical axis 52 of the 2D imager 20 and controlled in a coordinated fashion. Illumination sources placed so as to deliver energy impinging on plate 14 at an angle allows more compact shape of system 500 while eliminating the need for a beam-splitter filter. In addition, multiple illumination sources 18 allow more uniform illumination coverage on plate 14, and provide higher intensity illumination thereby enabling more rapid readout of the plate.

Figure 7:
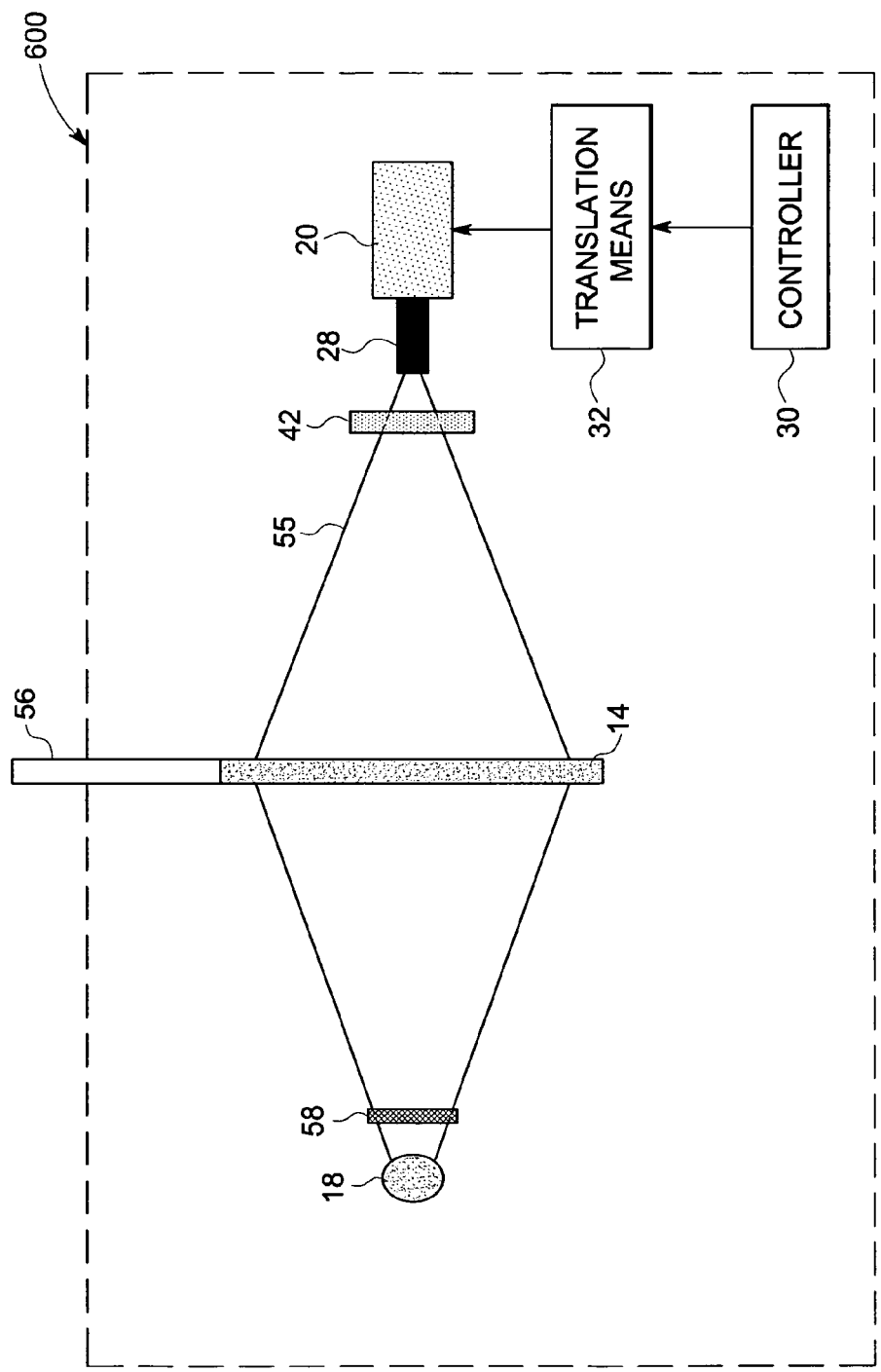
FIG. 7 is an illustration of a back-lit configuration for a two-dimensional CR readout system for reading a storage phosphor screen in accordance with one embodiment of the present invention.

FIG. 7 is an illustration of a back-lit configuration for a two-dimensional computed radiography (CR) readout system 600 for reading a storage phosphor screen in accordance with one embodiment of the present invention. In a particular embodiment, and as shown in FIG. 7, the illumination source 18 is a broad emission spectrum light source. The storage, phosphor screen 14 is disposed between the broad emission light source 18 and the 2D imaging system 20. In a particular embodiment, the storage phosphor screen 14 includes a transparent or translucent backing. An insertion slot 56 for storage phosphor screen 14 is provided. A filter 58 disposed between the broad emission light source 18 and the storage phosphor screen 14 is configured to spectrally shape the stimulating energy to the acceptance bandwidth of the phosphor in the storage phosphor screen 14. Reference numeral 55 represents the light containing wavelengths from the stimulating emission source 18 and the stimulated emission from the storage phosphor screen 14. The system 600 additionally includes a narrowband filter 42, disposed between the storage phosphor screen 14 and a lens system 28 operatively connected to the 2D imager. The wavelength range of the narrowband filter 42 is configured to match the wavelength range of the emission spectrum from the storage phosphor plate 14. Namely, the narrowband filter 42 is configured to further filter the residual stimulating (yellow-red) illumination and allow the passage of only desirable stimulated (blue) light from the storage phosphor screen 14.

Figure 8:
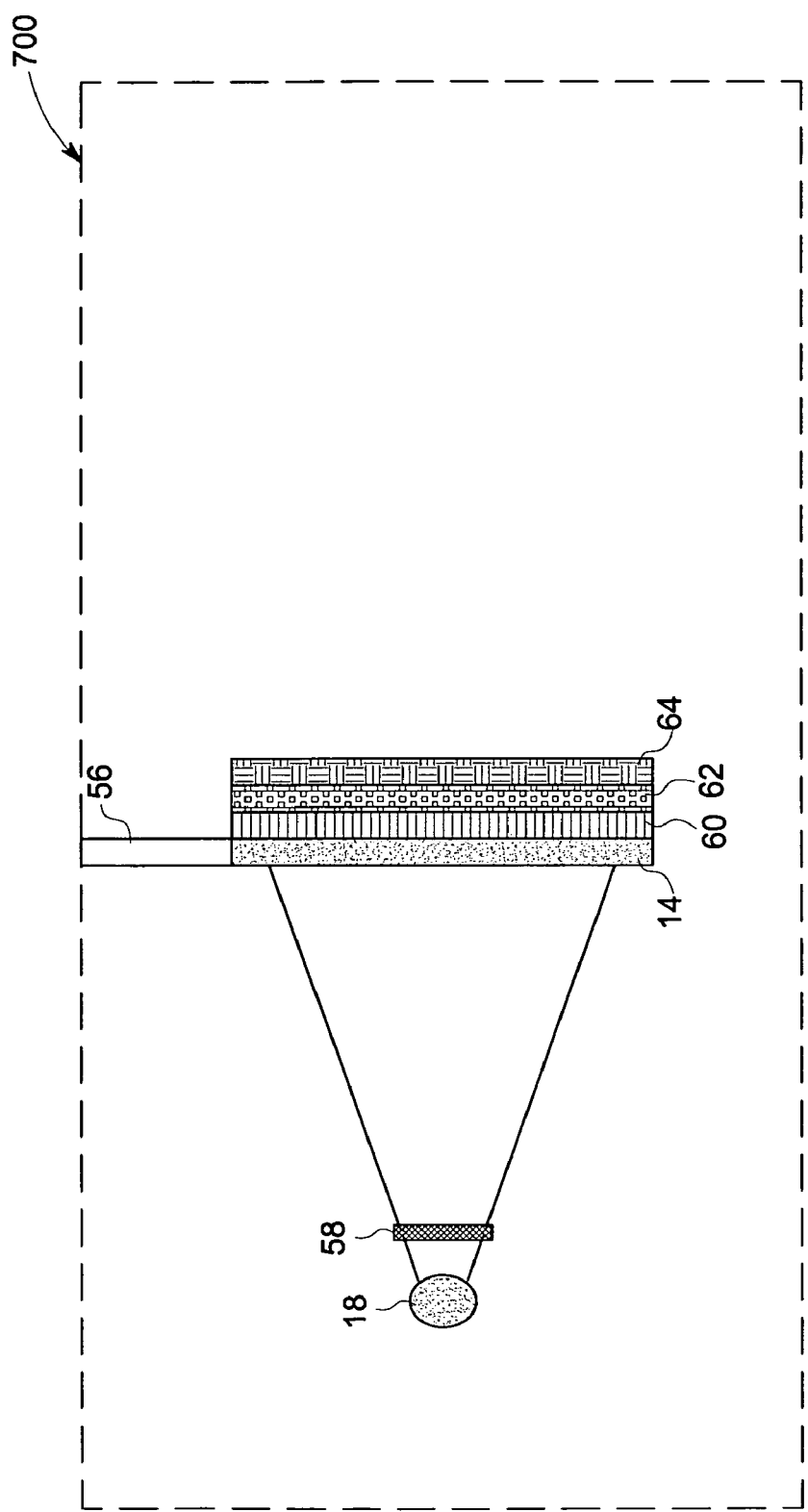
FIG. 8 is an illustration of a back-lit configuration for a two-dimensional CR readout system for reading a storage phosphor screen in accordance with another embodiment of the present invention.

FIG. 8 is an illustration of a back-lit configuration for a two-dimensional CR readout system 700 for reading a storage phosphor screen in accordance with another embodiment of the present invention. The back-lit configuration shown in FIG. 8 includes resting the storage phosphor 14 on an amorphous silicon flat panel detector 64 and illuminating it from the back. Further, to avoid yellow-red contamination on the read-out array, the phosphor 14 may be made with a blue dye to reduce transmission of stimulation light to the silicon flat panel detector 64. The storage phosphor 14 may be imaged through a fiber optic faceplate filter and collimator 60 that is configured with a blue fiber glass. The latter passes blue light, but absorbs the stimulating red light. The fiber optic faceplate with blue fibers may be surrounded by a cladding glass of a different refractive index and may be black coated. The cladding glass keeps the light in the fibers, and the black coating around it prevents cross talk across fibers. The black glass will also absorb any red stimulation light on the input surface and avoid contamination of such light traveling through the cladding. The fiber optic faceplate filter and collimator 60 and optical cement 62 may be deposited onto the amorphous silicon detector array 64 to further separate the stimulated emitted light from the stimulation light. As will be appreciated by those skilled in the art, appropriate filters may be used to provide separation and appropriate sensitivity for different stimulation and emission wavelengths.

Beneficially, the disclosed embodiments enable a non-scanning system to be able to capture a 2D area of the plate. In this manner, the disclosed system enables two-dimensional imaging to be implemented that will also reduce scanning artifacts such as streaking due to temporal effects between the stimulating light, the sampling rate and the movement of the plate in these systems. As discussed in more detail below, the acquisition of an all at once 2D image lends itself to 2D calibration routines that will enable normalization of the intensity shading of the x-ray beam, the illumination light, the phosphor structure noise, the optics in the system and the sensitivity distribution in the imager pixels.

As will be appreciated by those skilled in the art, while it would be desirable to have a detection system with uniform response over the entire plate surface (giving best possible image quality), in practice, it is necessary to compose a "correction" or weighting function that will be applied to the raw detected stimulation signal to correct for spatial non-uniformities in optical collection and detector sensitivity. Typically, this is done through a calibration procedure in which an image of a plate (exposed at constant intensity over the entire plate surface) is formed. This image is generally called the "flat-field" image" and is used to create a correction function which is applied to subsequent raw images of objects under study.

Traditionally, serially scanned CR systems form generic one-dimensional (1D) correction functions independent of specific plate identity information and apply the correction function equally to all rows of the raw image. Embodiments of the present invention create and apply 2D correction functions to create high quality images through the use of mechanical registration methods to fix the CR plate in the field of view of the 2D camera and machine-readable tags to record the unique identity of the imaging plate in use and enable retrieval of stored 2D correction functions keyed to a specific plate. In a particular embodiment, a method for registering a storage phosphor screen is provided. The method includes recording an identification number for a storage phosphor screen. The method further includes retrieving a correction function associated with the storage phosphor screen, based on the identification number and registering the storage phosphor screen in the field of view of an imaged object using the correction function. According to a particular embodiment, the identification number is recorded using machine-readable tags. According to another particular embodiment, registration of the storage phosphor screen in the field of view of the object comprises applying two-dimensional fiducial patterns to the storage phosphor screen.

The use of the correction technique, in accordance with embodiments of the present invention, enables the registration of the storage phosphor screen exactly with the 2D imager and enables lower noise operation (by removing non-uniform radiation sources) and lower structure noise in the storage phosphor screen. In addition, the disclosed correction technique reduces pixel to pixel variations in the 2D imager, thereby providing enhanced contrast to the object under examination. In addition, embodiments of the present invention provide for the use of 2D fiducial patterns to be applied to the plate or cassette or to be superimposed into the stored X-ray image of the object under study. These marks may take the form of regular sequences of tick marks (such as, for example, the marks on a ruler) permanently arranged along the edges of the cassette or plate or holder or a number of small 2D patterns within the field of view of the 2D image useful for performing a 2D computation of the exact x-y offset position of the plate relative to the imaging camera within the CR system. This enables less precise mechanical fixturing of the CR plate since software may be used to "re-register" the raw image to an exact position suitable to employ a pre-stored 2D correction pattern unique to the plate in use. Further, either the correction image could be registered to the plate or the plate to the correction image.

The embodiments illustrated and described above disclose a means to readout a computed radiography (CR) phosphor plate, either in a phosphor cassette, or as a free-standing sheet in a two-dimensional manner. Beneficially, the storage phosphor screen may be readout all at once in a fixed position, without the need for a mechanical plate-scanning mechanism. For the exemplary embodiment illustrated in FIG. 1, the phosphor from the storage phosphor screen is readout during X-ray exposure capturing prompt X-ray emission (that is typically wasted in CR systems) output and also after X-ray exposure, capturing stored emission (as in typical CR systems), thereby enabling optimum detective quantum efficiency for an imaging session. Further, as described above, a two-dimensional (2D) imager or light sensor in the form of a CCD or CMOS low light level camera enables high-speed image acquisition, while enabling a desired sensitivity for diagnosis or inspection. In addition, the use of the 2D imager reduces the mechanical damage to the CR plate, as the plate need not be transported through a one dimensional scanner device.

The embodiments described above have several advantages including the ability to achieve faster and more complete reads of CR plates leading to high efficiency, high productivity exposures, high image quality exposures for the same exposure levels, fast detector quantum efficiency (DQE), reduced scanning artifacts (such as banding, lines and shading), reduced damage to the imaging plate, simpler system architecture (due to less moving parts), and use of lower cost light sources. The high scanning efficiency further reduces the energy requirements required for exposures. Embodiments of the present invention also eliminate the need for repeated replacement of CR plates, as the exposure and readout process itself does not damage the plates. Embodiments of the present invention may be used in a variety of applications, such as, for example, non-destructive testing (NDT) and medical imaging.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computed radiography (CR) system for imaging an object, the CR system comprising:
a radiation source;
a storage phosphor screen, wherein the radiation source is configured to irradiate the storage phosphor screen through the object, and wherein the storage phosphor screen is configured to store a radiation energy pattern of the object;
an illumination source configured to illuminate at least a sub-area of the storage phosphor screen to stimulate emission of a plurality of photons from the storage phosphor screen;
a two dimensional (2D) imager configured to capture at least one two dimensional image from at least a sub-area of the storage phosphor screen using at least the stimulated emission photons, wherein the storage phosphor screen is further configured to emit a plurality of prompt emission photons upon irradiation, and wherein the 2D imager is further configured to receive the prompt emission photons from the storage phosphor screen; and
a dichroic filter positioned between the illumination source and the storage phosphor screen and configured to pass stimulating illumination from the illumination source to the storage phosphor screen and to reflect the stimulated emission photons from the storage phosphor screen, wherein the 2D imager is further configured to receive the stimulated emission photons reflected by the dichroic filter,
wherein the CR system is configured as a front lit CR system.

2. The CR system of claim 1, wherein the dichroic filter comprises a dichroic beam splitter.

3. The CR system of claim 1, further comprising a blue pass filter disposed between the dichroic filter and the 2D imager.

4. The CR system of claim 1, further comprising at least one shielding means and a radiation shield for the 2D imager disposed between the dichroic filter and the 2D imager.

5. The CR system of claim 1, wherein the 2D imager comprises a solid state camera.

6. The CR system of claim 5, wherein the solid state camera is selected from the group consisting of a CCD camera, a CMOS camera and a CID camera.

7. The CR system of claim 1, wherein the 2D imager comprises a photodiode array.

8. The CR system of claim 1, wherein the illumination source is configured to illuminate a sub-area of the storage phosphor screen.

9. The CR system of claim 1, wherein the illumination source is configured to illuminate the entire storage phosphor screen.

10. The CR system of claim 1, wherein the 2D imager is configured to capture at least one 2D image of a sub-array of the storage phosphor screen.

11. A computed radiography (CR) system for imaging an object, the CR system comprising:
a radiation source;
a storage phosphor screen, wherein the radiation source is configured to irradiate the storage phosphor screen through the object, and wherein the storage phosphor screen is configured to store a radiation energy pattern of the object;

an illumination source configured to illuminate at least a sub-area of the storage phosphor screen to stimulate emission of a plurality of photons from the storage phosphor screen;

a two dimensional (2D) imager configured to capture at least one two dimensional image from at least a sub-area of the storage phosphor screen using at least the stimulated emission photons; and a dichroic filter positioned between the illumination source and the storage phosphor screen and configured to pass stimulating illumination from the illumination source to the storage phosphor screen and to reflect the stimulated emission photons from the storage phosphor screen, wherein the 2D imager is further configured to receive the stimulated emission photons reflected by the dichroic filter, wherein the dichroic filter comprises a dichroic beam splitter, wherein the CR system is configured as a back lit CR system.

12. A computed radiography (CR) system for imaging an object, the CR system comprising:

a radiation source;

a storage phosphor screen, wherein the radiation source is configured to irradiate the storage phosphor screen through the object, and wherein the storage phosphor screen is configured to store a radiation energy pattern of the object;

an illumination source configured to illuminate at least a sub-area of the storage phosphor screen to stimulate emission of a plurality of photons from the storage phosphor screen; and a two dimensional (2D) imager configured to capture at least one two dimensional image from at least a sub-area of the storage phosphor screen using at least the stimulated emission photons, the CR system further comprising:

a lens system operatively connected to the 2D imager.

13. The CR system of claim 12, further comprising a controller configured to control the 2D imager and the lens system.

14. The CR system of claim 13, further comprising a translation means configured to perform at least one of: moving the 2D imager and focusing the lens system, wherein the controller is further configured to control the translation means.

15. The CR system of claim 12, wherein the 2D imager and the lens system are further configured to perform sub-array imaging.

16. A computed radiography (CR) system for imaging an object, the CR system comprising:

a radiation source;

a storage phosphor screen, wherein the radiation source is configured to irradiate the storage phosphor screen through the object, and wherein the storage phosphor screen is configured to store a radiation energy pattern of the object;

an illumination source configured to illuminate at least a sub-area of the storage phosphor screen to stimulate emission of a plurality of photons from the storage phosphor screen; and a two dimensional (2D) imager configured to capture at least one two dimensional image from at least a sub-area of the storage phosphor screen using at least the stimulated emission photons, wherein the 2D imager comprises a solid state camera, and wherein the solid state camera comprises a back-side illuminated CCD camera configured for enhancement and detection of blue light.

17. A computed radiography (CR) system for imaging an object, the CR system comprising:

a radiation source;

a storage phosphor screen, wherein the radiation source is configured to irradiate the storage phosphor screen through the object, and wherein the storage phosphor screen is configured to store a radiation energy pattern of the object;

an illumination source configured to illuminate at least a sub-area of the storage phosphor screen to stimulate emission of a plurality of photons from the storage phosphor screen; and a two dimensional (2D) imager configured to capture at least one two dimensional image from at least a sub-area of the storage phosphor screen using at least the stimulated emission photons, wherein the 2D imager is configured to capture at least one 2D image of a magnified region of the storage phosphor screen.

18. A computed radiography (CR) readout system comprising:

an illumination source configured to illuminate at least a sub-area of a storage phosphor screen to stimulate emission of a plurality of photons from the storage phosphor screen; and a two dimensional (2D) imager configured to capture at least one two dimensional image from at least a sub-area of the storage phosphor screen using the stimulated emission photons, wherein the 2D imager is configured to capture at least one 2D image of a magnified region of the storage phosphor screen.

19. The CR system of claim 18, wherein the 2D imager is configured to capture at least one 2D image of a sub-array of the storage phosphor screen.

20. The CR readout system of claim 18, further comprising a dichroic filter positioned between the illumination source and the storage phosphor screen and configured to pass stimulating illumination from the illumination source to the storage phosphor screen and to reflect the stimulated emission photons from the storage phosphor screen, wherein the 2D imager is further configured to receive the stimulated emission photons reflected by the dichroic filter.

21. The CR readout system of claim 20, wherein the dichroic filter comprises a dichroic beam splitter.

22. The CR readout system of claim 21, further comprising a blue pass filter disposed between the dichroic filter and the 2D imager.

23. The CR readout system of claim 18, further comprising a lens system operatively connected to the 2D imager.

24. The CR readout system of claim 18, wherein the 2D imager comprises a solid state camera.

25. The CR readout system of claim 24, wherein the solid state camera is selected from the group consisting of a CCD camera, a CMOS camera and a CID camera.

26. The CR readout system of claim 18, wherein the illumination source is configured to illuminate a sub-area of the storage phosphor screen.

27. The CR readout system of claim 18, wherein the illumination source is configured to illuminate the entire storage phosphor screen.

28. The CR readout system of claim 18, wherein the illumination source comprises at least one of a laser and a laser diode.

29. A computed radiography (CR) readout system comprising:
- an illumination source configured to illuminate at least a sub-area of a storage phosphor screen to stimulate emission of a plurality of photons from the storage phosphor screen;
- a two dimensional (2D) imager configured to capture at least one two dimensional image from at least a sub-area of the storage phosphor screen using the stimulated emission photons;
- a lens system operatively connected to the 2D imager; and
- a controller configured to control the 2D imager and the lens system.

30. The CR readout system of claim 29, further comprising a translation means configured to perform at least one of: moving the 2D imager and focusing the lens system, wherein the controller is further configured to control the translation means.

31. A computed radiography (CR) readout system comprising:
- an illumination source configured to illuminate at least a sub-area of a storage phosphor screen to stimulate emission of a plurality of photons from the storage phosphor screen;
- a two dimensional (2D) imager configured to capture at least one two dimensional image from at least a sub-area of the storage phosphor screen using the stimulated emission photons; and
- a lens system operatively connected to the 2D imager, wherein the 2D imager and the lens system are further configured to perform subarray imaging.

32. A computed radiography (CR) readout system comprising:
- an illumination source configured to illuminate at least a sub-area of a storage phosphor screen to stimulate emission of a plurality of photons from the storage phosphor screen; and
- a two dimensional (2D) imager configured to capture at least one two dimensional image from at least a sub-area of the storage phosphor screen using the stimulated emission photons, wherein the 2D imager comprises a solid state camera, and wherein the solid state camera comprises a back-side illuminated CCD camera configured for enhancement and detection of blue light.

33. A computed radiography (CR) readout system comprising:
- an illumination source configured to illuminate at least a sub-area of a storage phosphor screen to stimulate emission of a plurality of photons from the storage phosphor screen; and
- a two dimensional (2D) imager configured to capture at least one two dimensional image from at least a sub-area of the storage phosphor screen using the stimulated emission photons, wherein the illumination source is configured as a broad emission spectrum light source, the CR readout system further comprising:
- a filter configured to limit and match an illumination spectrum from the illumination source to an absorption function of the storage phosphor screen; and
- a beam-splitter configured to pass stimulating energy filtered by the filter to the storage phosphor screen and reflect stimulated readout energy to the 2D imager, wherein the filter is disposed between the illumination light source and the beam splitter.

34. The CR readout system of claim 33 further comprising:
- a narrowband filter configured to filter residual stimulating illumination from the illumination source and enable passage of stimulated light from the storage phosphor screen disposed between the beam splitter; and
- a lens system operatively connected to the 2D imager, wherein the narrowband filter is disposed between the beam splitter and the lens system.

35. A computed radiography (CR) readout system comprising:
- an illumination source configured to illuminate at least a sub-area of a storage phosphor screen to stimulate emission of a plurality of photons from the storage phosphor screen;
- a two dimensional (2D) imager configured to capture at least one two dimensional image from at least a sub-area of the storage phosphor screen using the stimulated emission photons, wherein the illumination source is configured as a broad emission spectrum light source, the CR readout system further comprising:
- a pre-filter configured to spectrally shape an illumination spectrum from the illumination source to an absorption function of the storage phosphor screen; and
- a beam-splitter filter disposed between the pre-filter and the storage phosphor screen, wherein the beam-splitter filter is configured to further spectrally shape stimulating energy from the illumination source and reflect stimulated readout energy from the storage phosphor screen to the 2D imager, wherein the pre-filter is disposed between the illumination light source and the beam-splitter filter.

36. The CR readout system of claim 35 further comprising:
- a narrowband filter configured to filter residual stimulating illumination from the illumination source and enable passage of stimulated light from the storage phosphor screen; and
- a lens system operatively connected to the 2D imager, wherein the narrowband filter is disposed between the beam-splitter filter and the lens system.

37. A computed radiography (CR) readout system comprising:
- an illumination source configured to illuminate at least a sub-area of a storage phosphor screen to stimulate emission of a plurality of photons from the storage phosphor screen; and
- a two dimensional (2D) imager configured to capture at least one two dimensional image from at least a sub-area of the storage phosphor screen using the stimulated emission photons, the CR readout system comprising one or more illumination sources, wherein each illumination source is configured as a broad emission spectrum light source, the CR readout system further comprising one or more filters disposed between respective ones of each of the one or more illumination sources and the storage phosphor screen, wherein each of the one or more filters is configured to match and limit an illumination spectrum from the respective one of the one or more illumination sources to an absorption function of the storage phosphor screen.

38. The CR readout system of claim 37 further comprising:
- a narrowband filter configured to filter residual stimulating illumination from the one or more illumination sources and enable passage of stimulated light from the storage phosphor screen; and a lens system operatively connected to the 2D imager, wherein the narrowband filter is disposed between the lens system and the storage phosphor screen.

39. A computed radiography (CR) readout system comprising:
an illumination source configured to illuminate at least a sub-area of a storage phosphor screen to stimulate emission of a plurality of photons from the storage phosphor screen; and
a two dimensional (2D) imager configured to capture at least one two dimensional image from at least a sub-area of the storage phosphor screen using the stimulated emission photons, wherein the storage phosphor screen is disposed between the illumination source and the 2D imaging system, the CR readout system further comprising a filter disposed between the illumination source and the storage phosphor screen, wherein the filter is configured to spectrally shape stimulating energy from the illumination source to an acceptance bandwidth of the phosphor in the storage phosphor screen.

40. The CR readout system of claim 39 further comprising:
a narrowband filter configured to filter residual stimulating illumination from the illumination source and enable passage of desirable stimulated light from the storage phosphor screen; and
a lens system operatively connected to the 2D imager, wherein the narrowband filter is disposed between the storage phosphor screen and the lens system.

41. A method of reading a storage phosphor screen, the method comprising:
illuminating at least a sub-area of the storage phosphor screen using an illumination source to stimulate emission of a plurality of photons from the storage phosphor screen; and
capturing at least one two-dimensional (2D) image using a 2D imager, from at least a sub-array of the storage phosphor screen using the stimulated photons, wherein the capturing step comprises capturing at least one 2D image from the entire storage phosphor screen, and wherein the capturing step further comprises capturing at least one 2D image from a magnified region of the storage phosphor screen.

42. A method of reading a storage phosphor screen, the method comprising:
illuminating at least a sub-area of the storage phosphor screen using an illumination source to stimulate emission of a plurality of photons from the storage phosphor screen; and
capturing at least one two-dimensional (2D) image using a 2D imager from at least a sub-array of the storage phosphor screen using the stimulated photons, wherein the capturing step comprises capturing at least one 2D image from a magnified region of the storage phosphor screen.

43. A method of reading a storage phosphor screen, the method comprising:
illuminating at least a sub-area of the storage phosphor screen using an illumination source to stimulate emission of a plurality of photons from the storage phosphor screen; and
capturing at least one two-dimensional (2D) image using a 2D imager from at least a sub-array of the storage phosphor screen using the stimulated photons, the method further comprising:
irradiating the storage phosphor screen through an object with a radiation source to store a radiation energy pattern of the object, wherein the irradiating step is performed prior to the illuminating and capturing steps, and wherein the capturing step comprises capturing at least one 2D image from the entire storage phosphor screen; and
repeating the irradiating, illuminating and capturing steps, wherein the repeating the capturing step comprises capturing at least one 2D image from a magnified region of the storage phosphor screen.

* * * * *